United States Patent
Cho

(10) Patent No.: US 7,093,429 B1
(45) Date of Patent: *Aug. 22, 2006

(54) REFORMING DIESEL FUEL FOR NOX REDUCTION

(75) Inventor: Byong K. Cho, Rochester Hills, MI (US)

(73) Assignee: GM Global Technology Operations Inc., Detroit, MI (US)

( * ) Notice: Subject to any disclaimer, the term of this patent is extended or adjusted under 35 U.S.C. 154(b) by 68 days.

This patent is subject to a terminal disclaimer.

(21) Appl. No.: 11/141,969

(22) Filed: Jun. 1, 2005

(51) Int. Cl.
*F01N 3/00* (2006.01)
(52) U.S. Cl. .............. 60/286; 60/275; 60/295
(58) Field of Classification Search .......... 60/274, 60/275, 295, 301, 286
See application file for complete search history.

(56) References Cited

U.S. PATENT DOCUMENTS

| | | | |
|---|---|---|---|
| 5,412,946 A * | 5/1995 | Oshima et al. | 60/286 |
| 6,038,853 A * | 3/2000 | Penetrante et al. | 60/274 |
| 6,374,595 B1 * | 4/2002 | Penetrante et al. | 60/275 |
| 6,776,606 B1 * | 8/2004 | Haskew | 431/2 |
| 2004/0000475 A1 * | 1/2004 | Cho et al. | 204/179 |
| 2004/0000476 A1 | 1/2004 | Cho et al. | |
| 2004/0045279 A1 * | 3/2004 | Pfendtner et al. | 60/275 |
| 2004/0107695 A1 | 6/2004 | Cho et al. | |

OTHER PUBLICATIONS

General Motors Corporation Co-Pending U.S. Appl. No. 10/864,717, filed Jun. 9, 2004, NO Reduction with Diesel Fuel Reformed by Nonthermal Hyperplasma.
General Motors Corporation Co-Pending US Patent Application, GP-305962, Continuous Reforming of Diesel Fuel for NOx Reduction.

* cited by examiner

*Primary Examiner*—Thomas Denion
*Assistant Examiner*—Loren C. Edwards
(74) *Attorney, Agent, or Firm*—Kathryn A. Marra

(57) ABSTRACT

The selective catalytic reduction of nitrogen oxides (especially NO and $NO_2$) in exhaust from diesel and other lean burn engines is improved by use of a compact hyperplasma reactor for generating ozone and other highly oxidizing species in a stream of air. A portion of the ozone containing air stream is blown directly into the exhaust for oxidizing NO to $NO_2$. The other portion of plasma treated air is used to fractionate and reform a volume of diesel fuel to produce low molecular weight hydrocarbons and oxidized hydrocarbons to be added to the exhaust as $NO_2$ reductants in the catalytic reduction.

11 Claims, 3 Drawing Sheets

REFORMING DIESEL FUEL FOR NOX REDUCTION

TECHNICAL FIELD

This invention pertains to the reduction of nitrogen oxides, NOx, in the exhaust of a lean-burn engine such as a diesel engine. More specifically, this invention pertains to the use of diesel fuel in the selective catalytic reduction of NOx where the diesel fuel is fractionated and reformed using an air-plasma stream from an efficient nonthermal plasma generator.

BACKGROUND OF THE INVENTION

Diesel engines and other lean-burn engines or power plants are operated at higher than stoichiometric air to fuel mass ratios for improved fuel economy. Such lean-burning engines produce a hot exhaust with a relatively high content of oxygen and nitrogen oxides ($NO_x$). The temperature of the exhaust from a warmed-up diesel engine is typically in the range of 200° C. to 400° C. and has a representative composition, by volume, of about 10–17% oxygen, 3% carbon dioxide, 0.1% carbon monoxide, 180 ppm hydrocarbons, 235 ppm $NO_x$ and the balance nitrogen and water. These $NO_x$ gases, typically comprising nitric oxide (NO) and nitrogen dioxide ($NO_2$), are difficult to reduce to nitrogen ($N_2$) because of the high oxygen ($O_2$) content in the hot exhaust stream.

One approach for NOx reduction in lean-burn engine exhausts is by injecting urea into the exhaust and passing the stream over a suitable reduction catalyst. Urea decomposes in the hot exhaust producing $NH_3$ that reacts with NOx to produce $N_2$ and $H_2O$. The practice is called selective catalytic reduction by urea (urea/SCR). But a drawback of the approach is that urea must be carried onboard the lean-burn engine powered vehicle.

Co-pending U.S. patent application Ser. No. 10/864,717, assigned to the same assignee as this invention, discloses a method of separately adding ozone and nonthermal plasma-reformed diesel fuel constituents to the exhaust stream flowing from the engine or power plant preparatory to selective catalytic reduction of NOx. Ozone is added to the exhaust stream for oxidation of NO to $NO_2$. And plasma-generated, low molecular weight oxygenated hydrocarbons and hydrocarbons from a fractionated portion of the diesel fuel hydrocarbon mixture are added to the exhaust as reactants for conversion of $NO_2$ to $N_2$ over the reduction catalyst. This process can be called diesel fuel/SCR.

The present specification describes a further and related improvement in non-thermal plasma processing of diesel fuel for reduction of NO and $NO_2$ in exhaust streams from lean-burn engines and power plants.

SUMMARY OF THE INVENTION

This invention provides an improved method of reducing $NO_x$ in a lean NOx exhaust using a suitable selective reduction catalyst(s). Separate side-stream additions of air plasma-reformed diesel fuel and ozone are made to the exhaust gas stream at locations upstream of the catalytic reduction reactor. These additions change the exhaust composition to improve the performance of the SCR catalysts without degrading them.

In the present invention, the altered $NO_x$ containing exhaust is ultimately passed into contact with a selective reduction catalyst. For example, a suitable catalyst is a dual-bed catalyst system in which the upstream bed is sodium Y zeolite or barium Y zeolite and the downstream bed is copper Y zeolite. These base metal-exchanged Y-type zeolite catalysts will sometimes be referred to in this specification as NaY, BaY or CuY, respectively. The activity of the dual-bed catalyst is enhanced by prior addition to the exhaust of an air plasma containing ozone followed by the addition of air plasma-fractionated and plasma-reformed diesel fuel to the exhaust gas. The ozone addition converts NO to $NO_2$ before the exhaust reaches the reduction catalyst reactor. The plasma-reformed diesel fuel provides oxygenated hydrocarbons for the reduction of NO and $NO_2$ to $N_2$ over the base metal-exchanged Y zeolite catalysts.

In accordance with a preferred embodiment of the invention, a stream of ambient air from, for example, the engine compartment is conducted through a single non-thermal plasma reactor to generate a plasma stream comprising ozone; other activated ionic, radical and atomic/molecular species; and residual air constituents. The ozone-containing air plasma stream is split into two branches. One branch is directed into the lean NOx exhaust for oxidation of NO to $NO_2$. The second branch is used to fractionate and reform a volume of diesel fuel-hydrocarbons.

Diesel fuel is pumped from a vehicle fuel tank or other fuel reservoir to an on-board or nearby fractionation/reformer vessel. The vessel may be heated, for example, to about 100° C. to about 150° C. The ozone/air containing plasma is bubbled up through the liquid fuel volume in the vessel to strip a vapor fraction. Contemporaneously, the flowing, chemically active plasma entrains, carries and reacts with the hydrocarbon molecules to form smaller (e.g., $C_2$–$C_3$) hydrocarbon molecules, alkanes and alkenes, and aldehydes and alcohols. This air plasma-reformed diesel fuel stream is blown into the hot flowing exhaust gas, either upstream or downstream of the ozone addition, providing reactants for the reduction of $NO_2$.

The fractionator/reformer vessel may be operated on a continuous basis for prolonged treatment of NOx-containing exhaust. Diesel fuel is supplied to the vessel to maintain a suitable liquid level for sparging with the air plasma stream. As the lighter hydrocarbons are stripped from the liquid volume and reformed, a higher molecular weight hydrocarbon liquid fraction is returned to the fuel reservoir for combustion in an engine.

In a preferred embodiment, the plasma generator is a tube having a dielectric cylindrical wall defining a reactor space. A linear, high voltage electrode is disposed along the axis of the tube within this reactor space. An outer ground electrode, comprised of electrically conductive wire (or the equivalent), is spirally wound around the cylindrical dielectric wall in a sequential pattern having a selected pitch that provides an axially discrete spacing between each turn of the wire. Application of a high frequency, AC voltage to the central electrode creates plasma in the ambient air passed through the reactor. The combination of the helical ground electrode having a discrete spacing between each turn and the linear axial electrode produces intertwined helical regions of active and passive electric fields. The active fields produce energetic electrons (plasma) in the air. The passive electric field regions allow better mass transfer of the air constituents and more efficient formation of ozone and activated ions and radicals. Such a flow-through plasma generator design has been termed a hyperplasma reactor because it facilitates the formation of ozone in a flowing stream of air with lower input of electrical power, i.e., lower W/L/s or lower J/L.

The practice of the invention will be illustrated using the above described dual-bed base metal-exchanged Y-type zeolite catalysts. But other suitable selective reduction catalysts may be used.

Other objects and advantages of the invention will become more apparent from a detailed description of the invention which follows.

DESCRIPTION OF PREFERRED EMBODIMENTS

The conversion of nitrogen oxides to nitrogen in the exhaust of a lean-burn engine or power plant is a challenging problem. The chemical reduction of NOx in the exhaust of a vehicle engine is further complicated because of cost and space limitations. This invention is particularly useful with a diesel engine powered vehicle because diesel fuel from an on-board fuel tank is used in a method for selective catalytic reduction of NO and $NO_2$ in the exhaust. And a single compact and efficient side-stream, nonthermal plasma generator is employed.

Figure 1:
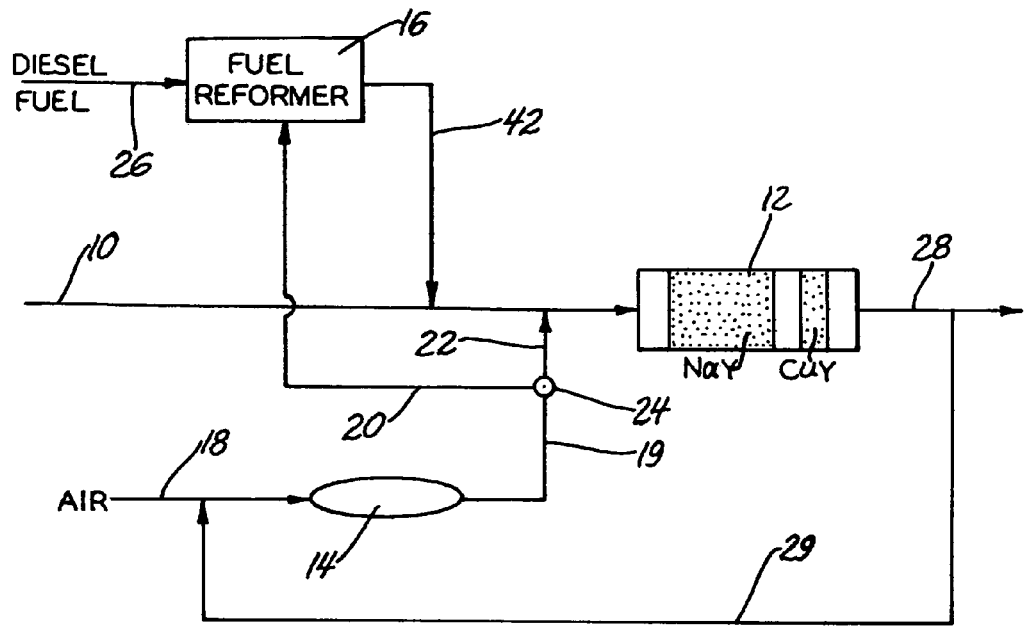
FIG. 1 is a schematic flow diagram of a method for producing ozone containing, air plasma in a single nonthermal plasma reactor and for splitting the air plasma into two streams. One stream is added to a NOx containing exhaust and the second stream is used to fractionate and reform diesel fuel hydrocarbons for subsequent addition to the exhaust. After the two side streams have been added, the exhaust is passed through an SCR reactor.

In FIG. 1 stream 10 represents the exhaust from a diesel engine powered vehicle such as a passenger car, truck or the like. The temperature of the exhaust from a warmed up light-duty diesel engine is typically in the range of about 200° C. to 400° C. and has a representative composition, by volume, of about 10–17% oxygen, 3% carbon dioxide, 0.1% carbon monoxide, 180 ppm hydrocarbons, 235 ppm $NO_x$ and the balance nitrogen and water. Exhaust stream 10 flows to a dual-bed catalytic reactor 12. But there are side-stream additions to exhaust 10 from nonthermal hyperplasma reactor 14 and diesel fuel fractionator and reformer 16. The design and operation of a suitable nonthermal plasma reactor 14 will be described in more detail with reference to FIG. 3 and the design and operation of a semi-batch mode diesel fuel fractionator and reformer 16 will be described with reference to FIG. 2. FIG. 4 provides a larger schematic view of dual-bed catalytic reactor 12.

The nonthermal plasma reactor 14 is sized and supplied with a suitable electric power to generate a stream volume of ozone-containing air for the dual purpose of a direct ozone addition to exhaust stream 10 and for fractionating and reforming diesel fuel for subsequent addition to the exhaust stream. Plasma reactor 14 is located close to, but away from, the hot exhaust pipe. It generates air plasma from ambient air [or a mixture of ambient air and a recycled exhaust gas (EGR, stream 29)], which contains ions, radicals, atoms and ozone. EGR stream 29 can be used to enhance the overall efficiency of the system, by warming up the feed air, stream 18, while recycling in the exhaust stream unconverted oxidized hydrocarbons (OHC's) and NOx for further treatment with the hyperplasma.

Figure 3:
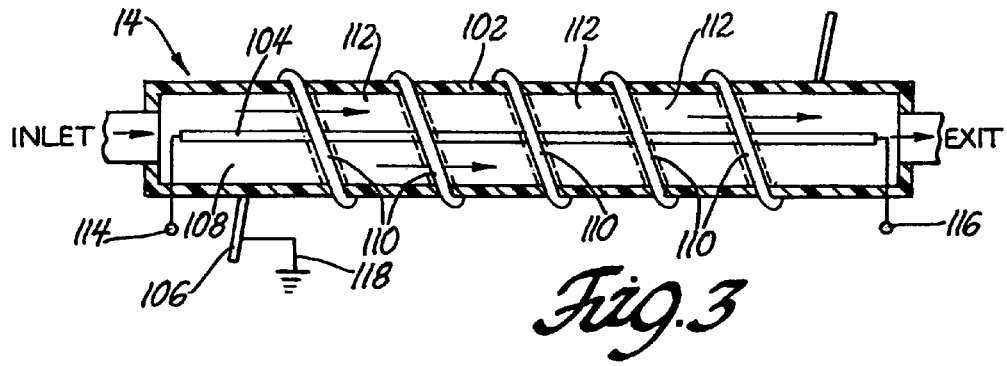
FIG. 3 is a side view, partly in cross section, of a non-thermal plasma reactor used in a practice of this invention.
Figure 4:
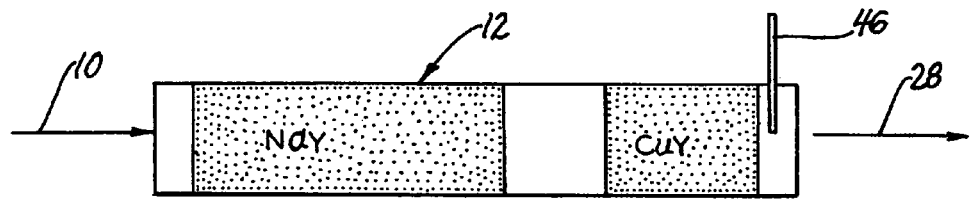
FIG. 4 is a schematic side view of a dual-bed base metal-exchanged Y zeolite catalytic reduction reactor as used in an embodiment of this invention.

In FIG. 3, a nonthermal plasma reactor 14 is illustrated that is suitable for generating ozone in a stream 18 (FIG. 1) of ambient air. The air stream is suitably supplied by an engine compartment blower, not shown, through a flow duct for air stream 18.

The nonthermal plasma reactor 14 comprises a round tubular dielectric body 102 suitably made of a ceramic material. The reactor 100 has two electrodes, a high voltage electrode 104 and a ground electrode 106, separated by the tubular dielectric body 102 and an air gap 108. The high voltage electrode 104 is a straight rod placed along the longitudinal axis of the tube 102. The ground electrode 106 is a conducting wire wound around the tubular dielectric body 102 in a helical pattern. The helical ground electrode 106 in combination with the axial high voltage electrode 104 provides intertwined helical regions of active 110 and passive 112 electric fields along the length of the reactor 100. The helical active electric field 110 around the ground electrode 106 is highly focused for effective plasma generation for ozone formation from molecular oxygen. Reactor 14 is effectively a hyperplasma generator for purposes of the practice of this invention.

A high voltage, high frequency electrical potential is applied to the end leads 114, 116 to the center electrode. The helical outer ground electrode 106 is grounded as indicated at 118. In the operation of the nonthermal hyperplasma reactor 14, air stream 18 (which may include re-circulated exhaust gas, stream 29, as described below) flows through the INLET of reactor 100 around center electrode 104 and within dielectric tube 102 and out EXIT end in the direction of the arrows seen in FIG. 3. The electrical potential applied to the center electrode 104 generates the above described active 110 and passive 112 fields within the reactor 100. These intertwined high potential, high frequency fields 110, 112 are very effective in generating reactive ozone, oxygen atom and radical containing species within the flowing air stream in the annular air gap 108. This ozone-containing air stream leaves the nonthermal plasma reactor 14 and enters plasma reactor outlet line 19 as indicated in FIG. 1. A further description of such a low power plasma reactor system is provided in United States Patent Application Publication No. 2004/0107695 by Cho et al and dated Jun. 10, 2004.

The output stream 19 from hyperplasma reactor 14 is divided by proportioning valve 24 into two air plasma streams 20 and 22. Air plasma stream 22 is added directly to exhaust stream 10 to oxidize NO to $NO_2$. Stream 20 flows to diesel fuel fractionator-reformer 16 to promote the fractionation and the partial oxidation of diesel fuel.

Figure 2:
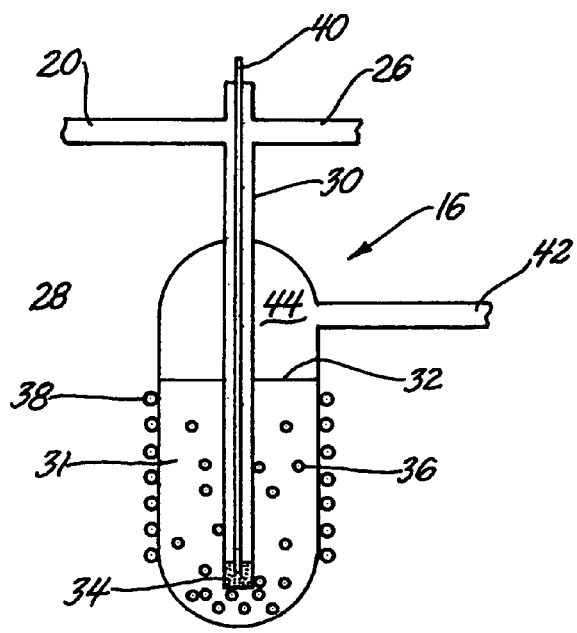
FIG. 2 is a schematic drawing of a vessel for fractionating and reforming liquid diesel fuel with a stream of ozone-containing air plasma.

FIG. 2 shows a diesel fuel reformer 16 in a semi-batch operating mode. Raw diesel fuel, line 26 in FIG. 1, is pumped (by means not shown) from a vehicle fuel tank or other source of the fuel, not shown. The hydrocarbon mixture containing, liquid fuel is delivered through line 26 to reformer vessel 28, suitably located on the vehicle. The fuel is added through fuel line 26 which terminates in vertical fuel/air plasma inlet tube 30 at a rate suitable to maintain a volume of liquid fuel 31 with a suitable fuel level 32. Makeup diesel fuel is fed through the vertical fuel/air plasma feed tube 30 to maintain the desired fuel level 32.

Air plasma generated by the hyperplasma reactor 14 flows through delivery line 20 to the fuel/air plasma inlet tube 30. The air plasma and incoming fuel flow downwardly through fuel/air plasma inlet tube 30 and through the quartz frit 34 making air plasma containing bubbles 36 in the liquid fuel volume 31. The bubbles 36, which contain highly reactive gaseous species such as ozone and radicals, generate a large interfacial area for absorption into and reaction with liquid fuel 31, while vigorously agitating the liquid fuel during their travel upward. This leads to an enhanced reformer performance for oxygen containing hydrocarbon (OHC) production from raw diesel fuel due to enhanced absorption and reaction. A suitable temperature of the liquid fuel 31 is controlled by the heating element 38 coiled around vessel 28 and a thermocouple 40 inserted through fuel/air plasma inlet tube 30. The preferred temperature range is 100° C.–150° C. for optimum performance of the fuel reformer 16. Thus the residual air plasma species and the vapor of the reformed fuel containing OHC's flows from the vapor portion 44 of vessel 28 into outlet line 42. The product stream from reformer 16 is carried through line 42 and is injected into the exhaust flow 10 for NOx reduction in a suitable selective catalytic reduction reactor 12 in the downstream.

Commercial diesel fuels are available in light to heavier grades depending on their usage. In general, the optimum operating condition of the fractionator/reformer depends on the grade of the diesel fuel. After reforming in accordance with this method, the stripped portion of the fuel readily yields $C_2$ and $C_3$ OHCs and the residual portion of the fuel contains high cetane value constituents suitable for compression ignition in an engine.

Referring to FIG. 4, in this example, selective catalytic reduction reactor 12 is a flow-through dual-bed catalytic reactor comprising an upstream bed of NaY zeolite and a downstream bed, usually of smaller volume, of CuY zeolite. Y-type zeolites are aliminosilicate materials of rather specific alumina-to-silica ratio and crystal structure. They have ion exchange capability and they are commercially available, often in their Na+ ion form. In the practice of this invention, NaY may be converted to BaY (or KY or CsY) or CuY by aqueous ion exchange.

In this example, the temperature of catalytic reduction reactor 12 is measured downstream of the CuY bed at the outlet of the reactor by thermocouple 46. The selective catalytic reduction reactor 12 promotes the chemical reaction between $NO_2$ and OHCs, producing innocuous $N_2$, $CO_2$ and $H_2O$. The chemical composition of the exhaust may be monitored by means, not shown, such as a gas-phase FTIR.

In this example, the temperature at the outlet of the catalytic reduction reactor 12 is used in controlling plasma power density in plasma reactor 14 and the volumetric feed ratios of reformed diesel fuel, line 42, and ozone, line 22 for effective operation of the catalytic reduction reactor 12. Temperature data from thermocouple 46 is transmitted to a digital controller (not shown) for controlling the plasma power density and the amount of stream additions through lines 22 and 42.

The heat and hydrocarbon content of stream 28 (FIG. 1) may be utilized as EGR, stream 29, by using it to supplement or replace a portion of air stream 18 entering the plasma reactor 14.

In general, the requirement for reformed diesel fuel constituents increases with increased $NO_x$ content in the exhaust and increased exhaust temperature (catalytic reactor temperature). For example, about 8 moles of reformed fuel normalized as $C_1$ hydrocarbon are required per mole of normalized $NO_x$ at a catalyst temperature of 200° C. for efficient $NO_x$ removal. The required amount of ozone decreases with the increase of the catalyst temperature. Thus, the ozone requirement is greatest at catalytic reactor temperatures of 150–200° C. and decreases to zero at reactor temperatures of 350–400° C.

The following experiments illustrate the practice and effectiveness of the invention.

EXPERIMENTAL

A simulated diesel exhaust gas composed, by volume, normalized at the catalyst inlet, of 181.5 ppm NO, 24.5 ppm $NO_2$, 17.6% $O_2$, 2% $H_2O$, and the balance $N_2$ was used in the following laboratory scale tests.

An unheated hyperplasma reactor like that shown in FIG. 3 was made of a 6 mm i.d. quartz tube which served as a dielectric barrier. With the high voltage electrode in the center, it is made in a concentric cylindrical geometry. The hyperplasma reactor was operated at room temperature. Ambient air was flowed through the annular space between the center electrode and the quartz tube. The ground electrode was made of a Ni-coated Cu wire (0.2 mm o.d.) wound around the outer surface of the quartz tube in 20 turns at a pitch of 2 mm. The total length of the plasma generating area was 4 cm.

High frequency electrical power (HV=+/−9 kV) was supplied to the reactor at a level of 10 joules per liter (standard conditions) of air delivered to the reactor. The flow of air was controlled to deliver 45 cc/min of the ozone-containing air plasma as a sidestream into the exhaust gas flow plus either 5.7 cc/min or 10.7 cc/min of air plasma to the diesel fuel reformer.

A diesel fuel fractionation and reforming vessel like that illustrated in FIG. 2 was made of quartz. An initial volume of 50 ml of Swedish diesel fuel was added to the vessel. The volume of fuel was heated and maintained at either 105° C. or 155° C. as noted in the results of the experimental operations summarized below. The flow of air plasma bubbled through the volume of fuel was 5.7 cc/min or 10.7 cc/min. In these tests the vessel was operated as a semi-batch reformer with a rate of addition of diesel fuel of 0.5 cc/h. In a larger scale practice of the process a reformer vessel for continuous fuel reforming would be used. Provision would be made for continuous fuel addition and continuous removal of stripped diesel fuel for recycling to a fuel reservoir as the lower molecular weight fraction is removed and reformed.

A dual-bed catalytic reactor (like that shown in FIG. 4) was made of a ¼" O.D. quartz tube containing NaY upstream and CuY downstream. CuY was made from NaY by aqueous ion-exchange of NaY obtained from Zeolyst Corp. The amounts of NaY and CuY used were 422 mg and 211 mg, respectively. The catalytic reactor was placed in an electric furnace whose temperature was controlled by a thermocouple located at the exit of the catalytic reactor. The catalytic reacor was operated over a temperature range of 200° C. to 400° C. The total flow rate of the stream to the reactor was 79 sccm and the system Pressure: was 101.3 kPa.

EXPERIMENTAL RESULTS

Figure 5:
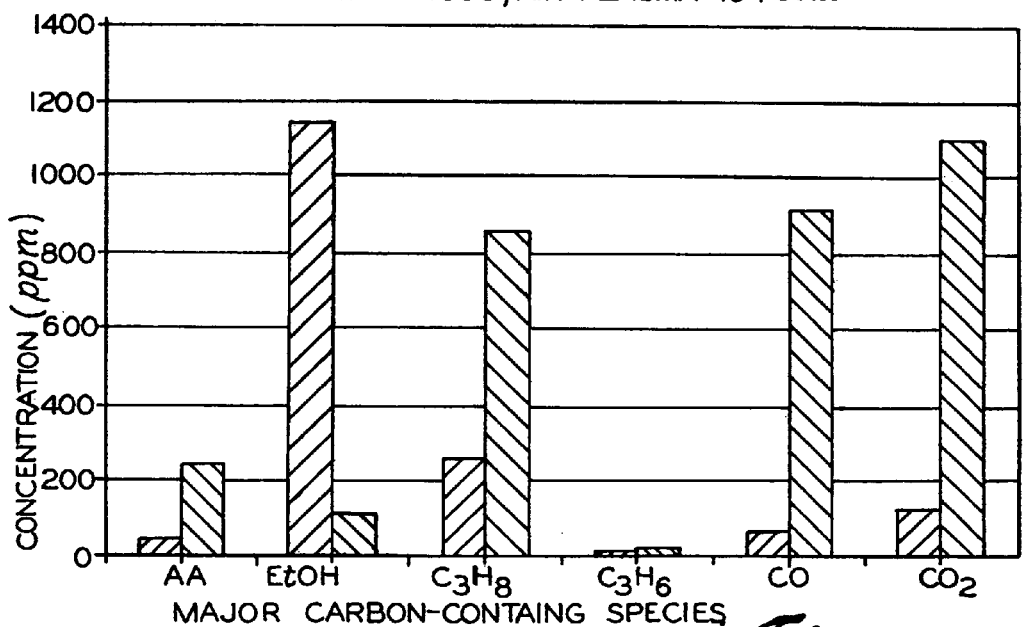
FIG. 5 is a bar graph showing the effect of operating conditions of the diesel fuel reformer in producing hydrocarbons and oxidized hydrocarbons as reductants for selective catalytic reduction of NOx. The identified reductants are reported as concentrations in parts per million of the air-ozone-reductants plasma stream.

The use of the low temperature ozone-containing air plasma to fractionate and reform diesel fuel was effective in generating OHC species as reductants for $NO_2$ in a lean-burn exhaust. FIG. 5 is a bar graph that shows the effect of operating conditions of the diesel fuel reformer for OHC & HC vapor production from raw diesel fuel.

The reformer was in a semi-batch operating mode with the feed rate of the makeup fuel at 0.5 cc/h provided by a syringe pump. Two operating conditions were compared; one with the reformer temperature at 105° C. and air plasma flow rate of 5.7 cc/min, and the other with the reformer temperature at 155° C. and air plasma flow rate of 10.7 cc/min. Major carbon-containing species in the stream from the reformer were measured by FTIR (Fourier transform infrared analysis instrument) and compared in FIG. 5. The concentrations in ppm in the vapor/plasma stream of aldehydes as acetaldehyde (AA), alcohols as ethyl alcohol (EtOH), alkanes as propane ($C_3H_8$), alkenes as propylene ($C_3H_6$), carbon monoxide (CO) and carbon dioxide ($CO_2$) are recorded in the bar graphs.

The predominant OHC is C2+ alcohols for the low-temperature operating conditions (105° C.), while it is C2+ aldehydes for the high-temperature operating conditions (155° C.). It is particularly remarkable for the low-temperature operating conditions that a large amount of OHC in the form of C2+ alcohol can be produced from raw diesel fuel with little formation of CO and $CO_2$. Neither CO or $CO_2$ contribute to the catalytic reduction of NOx, and thus their formation is considered to be a waste of valuable HC.

Figure 6:
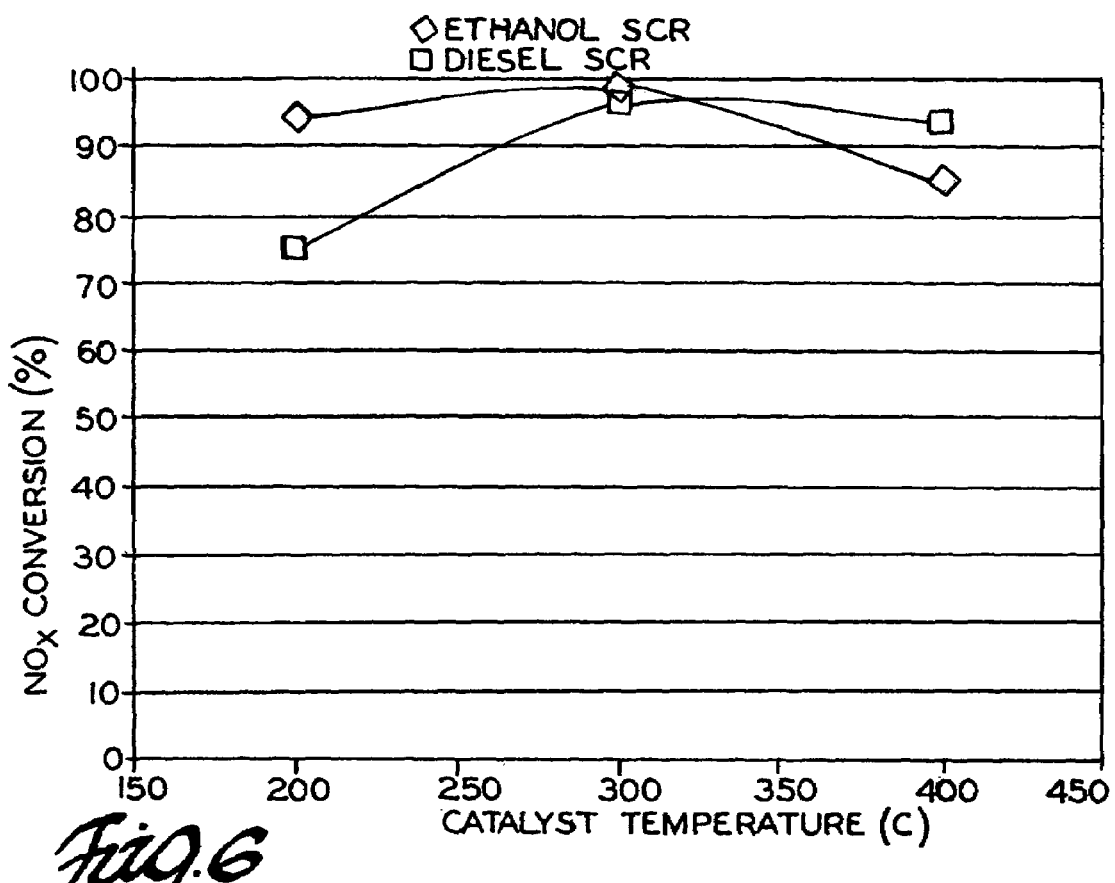
FIG. 6 is a graph of NOx conversion in percentage reduced to $N_2$ versus catalyst temperature in degrees C. The use of fractionated and reformed diesel fuel as reductant (square data points) is compared with the use of ethanol as the reductant (diamond data points).

FIG. 6 compares the NOx reduction performance of the Diesel/SCR with that of the Ethanol/SCR as a function of catalyst temperature. The data indicate that reformed diesel fuel vapor is more effective than ethanol at high temperatures (>300° C., approximately), but less effective at low temperatures (<300° C., appxoimately) for NOx reduction over the dual-bed catalysts containing NaY (or BaY) and CuY. The average NOx conversion performance of the Diesel/SCR system over the relevant temperature range (200° C.–400° C.) is about 90% conversion, which is comparable to that of the Ethanol/SCR system. In the case of Diesel/SCR, the amount of OHC added to the exhaust was increased by increasing the air plasma flow through the reformer with increasing catalyst temperature; 5.7, 10.7, and 15,7 ccm of air plasma flow at 200° C., 300° C., and 400° C., respectively. For the ethanol/SCR case, the amount of ethanol added to the exhaust was increased with increasing catalyst temperature; 600, 1200, and 2400 ppm of ethanol at 200° C., 300° C., and 400° C., respectively. The plasma power was kept constant for both cases.

Figure 7:
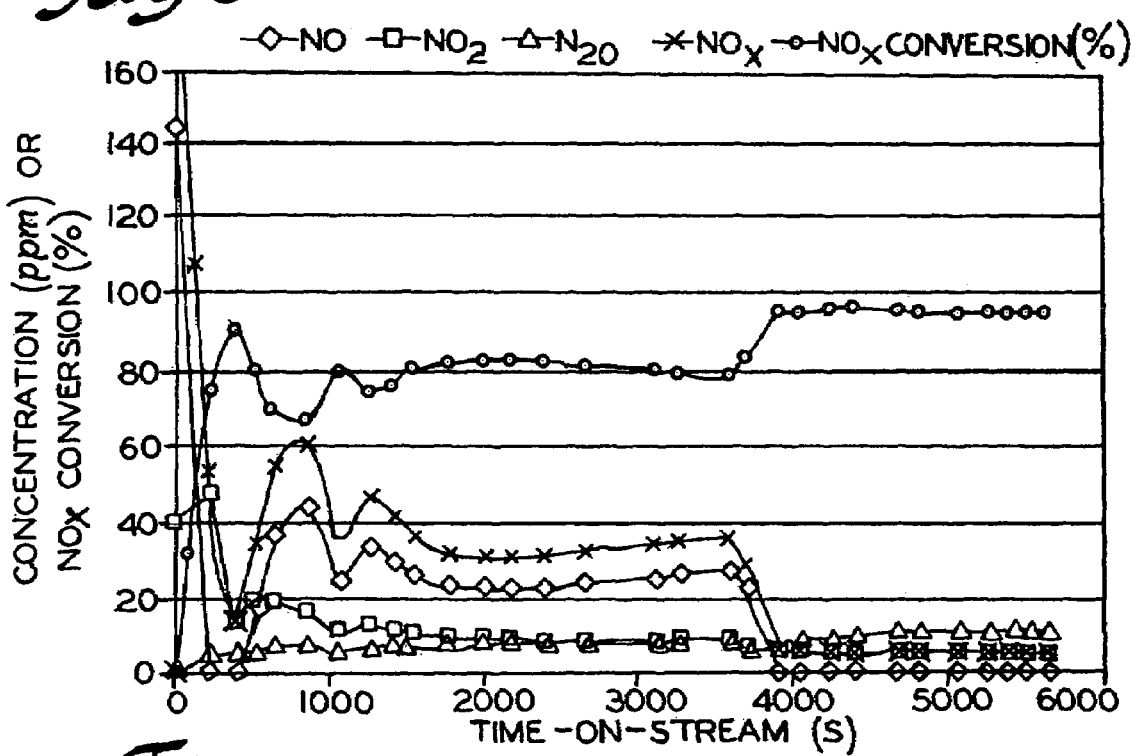
FIG. 7 is a graph of transient evolution of nitrogen-containing species at the outlet of a NaY—CuY dual-bed catalytic reactor at 300° C. Conversion of NOx is reported in percentage. Amounts of respective nitrogen oxides are reported in ppm of the exhaust gas.

FIG. 7 shows the transient evolution of N-containing species at the outlet of the dual-bed catalytic reactor at 300° C. in the Diesel/SCR system. The catalysts reached the steady state in about 30 minutes on stream without any indication of catalyst deactivation. The steady-state NOx conversion was 80% when the flow rate of the air plasma to the fuel reformer was 5.7 cc/min. The NOx conversion improved to 96%, in response to the increased flow rate of the air plasma to 10.7 cc/min after one hour on stream with the air plasma flow rate of 5.7 cc/min. This finding suggests that the flow rate of the air plasma to the fuel reformer can be used to controll the overall NOx conversion performance of the Diesel/SCR system. It is notable that there is a small amount of $N_2O$ (~10 ppm) formed over the catalyst.

The practice of the invention has been illustrated by specific examples. The scope of the invention is not intended to be limited to the disclosures of the examples.

What is claimed is:

1. A method of reducing nitrogen oxides, including NO and $NO_2$, in an exhaust stream at a temperature above about 150° C., said method comprising:
    flowing ambient air through a nonthermal plasma reactor to generate a plasma reactor output stream comprising oxidizing constituents, including ozone, and residual air constituents;
    bubbling at least a portion of the plasma reactor output stream through a volume of liquid diesel fuel to strip a vapor portion of diesel fuel hydrocarbons from the liquid volume into the plasma reactor output stream and to produce a fractionated and reformed diesel fuel containing stream comprising hydrogen-carbon-oxygen containing molecules;
    adding the fractionated and reformed diesel fuel containing stream to said exhaust stream for the reduction of said nitrogen oxides.

2. A method of reducing nitrogen oxides as recited in claim 1, the method further comprising:
    adding a portion of the plasma reactor output stream to the exhaust stream for oxidation of NO to $NO_2$, the ozone containing plasma being added to the exhaust stream separately from said fractionated and reformed diesel fuel-containing stream.

3. A method of reducing nitrogen oxides as recited in claim 1, the method further comprising:
    adding a portion of the plasma reactor output stream to the exhaust stream for oxidation of NO to $NO_2$, the ozone containing plasma being added to the exhaust stream separately from the fractionated and reformed diesel fuel-containing stream; and, thereafter contacting the exhaust stream with a reduction catalyst for nitrogen oxides.

4. A method of reducing nitrogen oxides as recited in claim 1 further comprising:
    adding a portion of the plasma reactor output stream to the exhaust stream for oxidation of NO to $NO_2$, the ozone-containing plasma being added to the exhaust stream separately from the fractionated and reformed diesel fuel-containing stream; and, thereafter
    contacting the exhaust stream with a dual-bed reduction catalyst comprising NaY zeolite and/or BaY zeolite in the first bed and CuY zeolite in the second bed to reduce the nitrogen oxides to $N_2$.

5. A method of reducing nitrogen oxides as recited in claim 1 wherein the non-thermal plasma reactor is a tubular vessel having a reactor space therein for flow-through passage of air, the plasma reactor comprising a high voltage electrode disposed within said reactor space and a ground electrode helically coiled around said tubular vessel in a discretely spaced pattern, thereby providing intertwined helical passive and active electric fields for the generation of the plasma reactor output stream.

6. A method of reducing nitrogen oxides, including NO and $NO_2$, in an exhaust stream from a diesel engine at a temperature above about 150° C., the method comprising:

flowing ambient air through a nonthermal plasma reactor to generate a plasma reactor output stream comprising oxidizing constituents including ozone, and residual air constituents;

adding a first portion of said plasma reactor output stream to the exhaust stream for oxidation of NO to $NO_2$;

bubbling a second portion of the plasma reactor output stream through a volume of liquid diesel fuel to strip a vapor portion of diesel fuel hydrocarbons from the liquid volume into the plasma reactor output stream and to produce a fractionated and reformed diesel fuel containing stream comprising hydrogen-carbon-oxygen containing molecules;

adding the fractionated and reformed diesel fuel containing stream to said exhaust stream for the reduction of said nitrogen oxides separately from the addition of the first portion of said plasma reactor output stream to the exhaust stream; and, thereafter contacting said exhaust stream with a reduction catalyst for nitrogen oxides.

7. A method of reducing nitrogen oxides as recited in claim 6 further comprising:

contacting the exhaust stream with a dual-bed reduction catalyst comprising NaY zeolite and/or BaY zeolite in the first bed and CuY zeolite in the second bed to reduce said nitrogen oxides to $N_2$.

8. A method of reducing nitrogen oxides as recited in claim 6 wherein the non-thermal plasma reactor is a tubular vessel having a reactor space therein for flow-through passage of air, the plasma reactor comprising a high voltage electrode disposed within said reactor space and a ground electrode helically coiled around said tubular vessel in a discretely spaced pattern, thereby providing intertwined helical passive and active electric fields for the generation of the plasma reactor output stream.

9. A method of reducing nitrogen oxides, including NO and $NO_2$, in an exhaust stream from a diesel engine for powering a vehicle, the exhaust being at a temperature above about 150° C., the method comprising:

blowing ambient air through a tubular non-thermal plasma reactor to generate a plasma reactor output stream comprising oxidizing constituents including ozone, and residual air constituents;

bubbling a first portion of the plasma reactor output stream through a volume of liquid diesel fuel to strip a vapor portion of diesel fuel hydrocarbons from the liquid volume into the plasma reactor output stream and to produce a fractionated and reformed diesel fuel containing stream comprising hydrogen-carbon-oxygen containing molecules;

adding the fractionated and reformed diesel fuel containing stream to said exhaust stream for the reduction of said nitrogen oxides adding a second portion of said plasma reactor output stream to said exhaust stream for oxidation of NO to $NO_2$, said ozone containing plasma being added to said exhaust stream separately from, and prior to, the addition of the fractionated and reformed diesel fuel containing stream; and, thereafter contacting said exhaust stream with a reduction catalyst for nitrogen oxides.

10. A method of reducing nitrogen oxides as recited in claim 9 comprising:

contacting said exhaust stream with a dual bed reduction catalyst comprising NaY zeolite and/or BaY zeolite in the first bed and CuY zeolite in the second bed to reduce said nitrogen oxides to $N_2$.

11. A method of reducing nitrogen oxides as recited in claim 9 wherein the non-thermal plasma reactor is a tubular vessel having a reactor space therein for flow-through passage of air, the plasma reactor comprising a high voltage electrode disposed within said reactor space and a ground electrode helically coiled around said tubular vessel in a discretely spaced pattern, thereby providing intertwined helical passive and active electric fields for the generation of the plasma reactor output stream.

* * * * *